United States Patent [19]

Hofmann et al.

[11] Patent Number: 5,233,625
[45] Date of Patent: Aug. 3, 1993

[54] METALLURGICAL VESSEL WITH METALLIC ELECTRODE HAVING READILY REPLACEABLE WEAR PART

[75] Inventors: Werner Hofmann, Moers; Ewald Feuerstacke, Dorsten; Andreas Schüring, Mühlheim, all of Fed. Rep. of Germany

[73] Assignee: Mannesmann Aktiengesellschaft, Dusseldorf, Fed. Rep. of Germany

[21] Appl. No.: 738,103

[22] Filed: Jul. 30, 1991

[30] Foreign Application Priority Data

Aug. 23, 1990 [DE] Fed. Rep. of Germany ....... 4026897

[51] Int. Cl.⁵ .......................... H05B 7/06; F27B 3/20
[52] U.S. Cl. ........................................ 373/94; 373/72
[58] Field of Search ............... 373/94, 95, 52, 36–38, 373/61–66, 72

[56] References Cited

U.S. PATENT DOCUMENTS

| | | | |
|---|---|---|---|
| 701,218 | 5/1902 | Morani | 373/95 |
| 4,423,512 | 12/1983 | Lugsheider et al. | 373/72 |
| 4,435,812 | 3/1984 | Guido et al. | 373/72 |
| 4,628,516 | 12/1986 | Voss-Spilker et al. | 373/72 |
| 4,646,316 | 2/1987 | Michelet et al. | 373/72 |
| 4,685,112 | 8/1987 | Michelet et al. | 373/72 |
| 4,754,464 | 6/1988 | Feuerstake | 373/72 |
| 4,982,411 | 1/1991 | Michelet et al. | 373/72 |
| 5,125,003 | 6/1992 | Hamy et al. | 373/94 |

FOREIGN PATENT DOCUMENTS 3835785  5/1989  Fed. Rep. of Germany ........ 373/94

Primary Examiner—Bruce A. Reynolds
Assistant Examiner—John A. Jeffery
Attorney, Agent, or Firm—Cohen, Pontani, Lieberman, Pavane

[57] ABSTRACT

A metallurgical vessel (10) includes at least one metallic electrode (20) fastened thereto having a chamber within the vessel (10) for holding a melt (19) and having a bottom surface, a shell (14) abutting the bottom surface, and a flanged tube (31) arranged on the shell (14) with the flanged tube (31) having a flanged surface (32). The electrode (20) is disposed coaxially with respect to the flanged tube (31) and is formed by first and second bars (21, 22) connectable to one another. The first bar (21) has the top face positioned proximate to the bottom surface of the chamber and penetrates the vessel (10) for contact with the melt. The second bar (22) is positioned against the bottom face of the first bar (21) and extends out from the vessel (10), the first bar having a should region (23) positioned annularly thereabout adapted to contact and lean against the flanged surface (32) of the flanged tube (31). A coolant provision and discharge device provide coolant to the second bar (22) through a coolant feed line (51) and a discharge line (53) and a current feed device provides current to the electrode. A hold-down mechanism (33) attaches the current feed device, the coolant feed line (51) and the discharge line (53) to the flanged tube (31).

20 Claims, 2 Drawing Sheets

METALLURGICAL VESSEL WITH METALLIC ELECTRODE HAVING READILY REPLACEABLE WEAR PART

FIELD OF THE INVENTION

The present invention relates to a metallurgical vessel, in particular a furnace vessel of a DC-arc furnace having at least one metal electrode fastened to the shell of the bottom of the vessel. Each electrode passes at one end through the furnace wall and contacts the melt present within the vessel, while at the other end can be connected to a source of supply of electrical current as well as a source of supply of cooling fluid.

BACKGROUND AND OBJECTS OF THE INVENTION

In metallurgical vessels having bottom electrodes, for instance plasma melt furnaces or vacuum arc furnaces, the electrical contact with the melt is produced by electrodes which are introduced in the refractory lining of the vessel. Such electrodes are, in this type of application, particularly subject to thermal wear. In order to reduce this thermal wear, the metal electrodes are typically cooled.

U.S. Pat. No. 4,435,812 shows the use of gases, and particularly air, as a cooling fluid. The disadvantages of this type of cooling, however, is the limited cooling efficiency occasioned by the use of air as the cooling medium.

In order to increase the removal of heat, liquids have also been considered as coolants. Thus, U.S. Pat. No. 4,423,512 discloses a bar-shaped electrode through which cooling water is introduced under pressure via a feed tube into a cavity in the electrode. The disadvantage of this prior art device, however, is that the cooling water is conducted up into the furnace vessel. In the event of possible negative situations occurring like, e.g., overheating of the electrode and melting of the closure part facing the melt, or the occurrence of cracks in the solid metallic part extending up to the water-cooled part of the electrode, the cooling water, which is under pressure, could penetrate below the molten bath and into the hearth. The result would be a gas explosion. Consequently, this device is potentially dangerous to the operating personnel and could cause destruction of the furnace.

Moreover, in the aforementioned '225 European patent, a layer of metal having low thermal conductivity and a low melting point is provided in an expensive fashion, by being positioned between the wear part and the cooling part of the bottom electrode. An electrode of this construction impedes the flow of heat and current and can, furthermore, not be used again, not even in parts.

Federal Republic of Germany 38 35 785 shows a bottom electrode for electric melting furnaces in which a cap is detachably connected to the wear part. The bottom electrode disclosed in this patent not only has low cooling capacity as a consequence of the cap, so that other cooling devices are necessary, but, in addition, means for the rapid replacement of the electrode.

In addition to the disadvantageously expensive work required for the replacement of the electrode shown in the '785 patent, this reference also fails to disclose mechanisms for the absorption of impacts or jolts, which can cause a change in position of the electrode and the danger of a breakthrough of the furnace. For example, if scrap is used, particularly individual pieces of scrap, the scrap can fall, hitting the end surface of the wear part of the bottom electrode and forcing it axially out of the bottom of the vessel.

Accordingly, it is an object of the present invention to avoid the above-mentioned disadvantages and create a metallurgical vessel which has a structurally simple, strong, wear-resistant bottom electrode which can be easily replaced and in which the essential parts can be reused.

SUMMARY OF THE INVENTION

The foregoing and other objects and advantageous features of the invention are achieved by the provision of an electrode divided structurally and functionally into two parts: a wear part and a reusable part. These two electrode parts, which are detachably connected to each other, are held by a mount which is fastened in the shell of the furnace and on which the fluid connections are arranged. The part of the electrode facing the melt acts as the wear part and consists of a simple metallic block, preferably of a material corresponding with that of the melt. The part of the electrode facing away from the melt consists of copper and has channels for the introduction of a coolant. A portion of the copper part extends out of the furnace. Contact jaws for introducing the electric current can be pressed against the outer shell of this copper part.

The simple, rapid replacement of the interconnected parts of the electrode is effected by opening the clamping device which presses the current cables by means of the contact jaws against the copper parts of the electrode. The electrode can then be pulled out of the mount and the flange from the furnace-vessel side. The means for supplying current and cooling water is fixed in place via a hold-down element on the floor of the furnace and thus remains in position while the electrode is changed.

It should be appreciated that this method of changing the electrode represents a considerable simplification for the opening personnel over prior art devices, since otherwise expensive work beneath the furnace can be avoided. Such work is typically carried out under cramped spatial conditions and, in addition, without a crane.

The electrode removed in accordance with the preferred embodiments of the instant invention is separated by simple detachment of the connection between the copper part and the wear part and a new wear part is thereafter supplied and reinserted. All essential parts can, therefore, be re-used again and again upon a mere change or replacement of the inexpensive wear part of the electrode. The newly formed electrode can be introduced in a simple manner from the inside of the vessel into the flanged tube and is thereby rendered ready for use again upon the closing of the clamping device.

The copper part of the electrode is designed from a thermal standpoint with respect to its dimensions so that repeated remachining of the head surface of the copper cooling part is possible thereby assuring good contact between the two parts (i.e., the wear part and the copper part). In order to avoid interference in heat transfer between the wear part and the copper part of the electrode, it is has been determined that these two parts should be connected in force-locked manner to each other by means of clamping screws or intimately by welding or soldering. The electrode parts can, in this regard also be connected to each other such that solder is introduced between the separation surfaces and, in addition, they are pressed together by vices.

A particularly strongly constructed bottom of the electrode is obtained by the use and arrangement of the flanged tube. The flanges tube serves, among other things, to divert forces acting on the electrode from the wear part into the bottom of the vessel. Such forces occur, inter alia upon the loading of scrap or due to the ferrostatic pressure which molten steel exerts. The copper part and the holding device for the supplying of the fluids are thus not subjected to any mechanical loading as a consequence of this construction. As a further result of this construction, relatively soft copper of good conductivity can be used. By transmitting the forces that occur into the bottom of the vessel by means of the flanged tube, the cooling-water and current supply lines are, furthermore, not subjected to loading and thus the possibility of damage to these supply lines is also reduced.

Splash water is used to effectively cool the electrode. In the case of forced cooling in the form of channels or tubes through which water flows, a considerable expense must be incurred due to limited heat transfer qualities. In order to obtain a sufficient cooling action in forced cooling devices, the heat exchange surfaces are typically enlarged and/or the speed of the cooling water is increased. Splash water cooling, on the other hand, can be effected with a simple geometry of the cooling chamber. With a large number of small cooling water channels there is the danger that due to special local conditions of flow, for instance, at weld seams, bends in the channel, etc., steam bubbles will be formed. These steam bubbles can have the effect of a shut-off valve if they are large enough and properly positioned, with the result that the flow of the cooling fluid is impeded and possibly interrupted entirely. Comparable negative effects can be completely eliminated with the present concept using splash water cooling. In the splash water cooling in accordance with the present invention, the coolant is fed via pipelines which are open at the head end and can be provided with nozzles in order to increase the speed of emergence. The cooling water strikes against the end wall of the blind holes made in the electrode and is, thus, able to absorb considerable amounts of heat. The accumulation of steam bubbles is not possible due to the high kinetic energy of the impinging water. The cooling water then discharges from the electrode over the discharge line, which is considerably larger than the feed line. The discharge can be increased by drawing off the coolant via suction. In addition, any steam bubbles which may have formed are removed from the cooling surface by such suction.

Disk pumps are particularly suitable for such drawing off, since they are insensitive to the presence of air bubbles in the liquid coolant.

The cooling action of the intensive water cooling system including the use of splash water is enhanced indirectly via the copper core, which is a good and conductor of heat, conducts up to just below the melt front. In this way, it is possible to keep the melt front far away from the bottom of the vessel. In addition to the increase in safety in operation, the wear of the electrode and of the surrounding brick work is thereby also minimized.

By the arrangement and structural development of the cooling channels and by controlling of the quantities and speed of the cooling liquid, the zones of cooling action can be specifically affected. By the arrangement of thermocouples in the electrode, the position of the melt front can be reliably monitored.

BRIEF DESCRIPTION OF THE DRAWINGS

Other objects and many of the attendant advantages and features of the instant invention will be readily appreciated and better understood by reference to, and through consideration of the following detailed description of the currently preferred embodiments of the invention in conjunction with the accompanying drawings, in which like reference numerals designate similar parts throughout the several views thereof, and wherein.

DETAILED DESCRIPTION OF THE PREFERRED EMBODIMENTS

Figure 1:
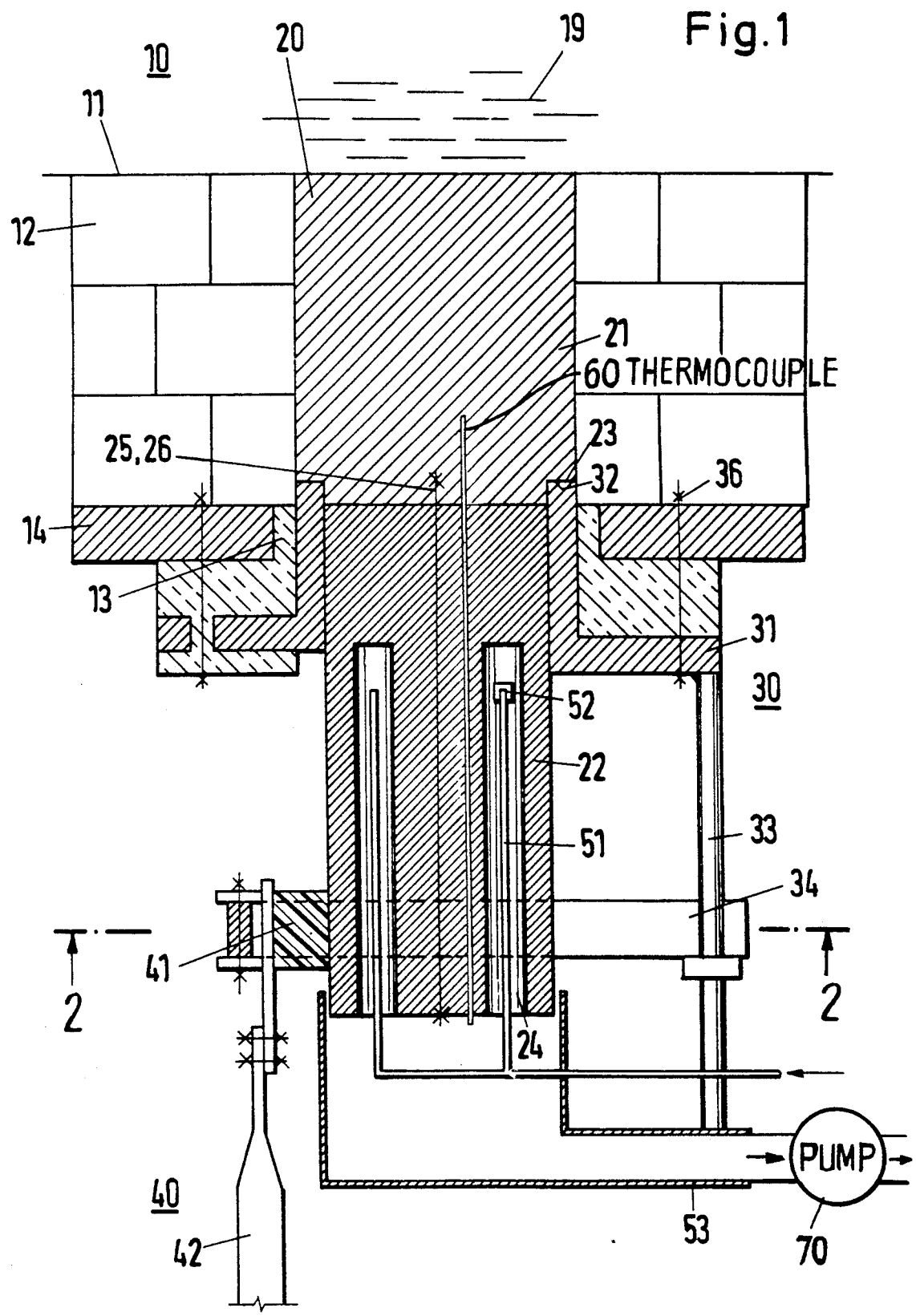
FIG. 1 is a sectional side view of the bottom electrode, in accordance with a preferred embodiment of the present invention.

FIG. 1 shows a portion of a metallurgical vessel 10 having a vessel bottom 30 which has a refractory lining 12 as well as a shell 14. A melt 19 is also shown with in the bottom of the metallurgical vessel.

A holding device 30 is detachably fastened by screws 36 to the shell 14, separated from it by an insulation 13. The holding device 30 comprises a flanged tube 31 on which a holding element 33 is arranged facing away from the bottom of the vessel. Clamping ring 34 (see in this connection FIG. 2) is positioned on the holding element 33. Likewise, a plurality of cooling fluid lines, namely a pipe feed line 51 and a discharge 53, are also fastened to the holding element 33. Current feed parts 40, consisting essentially of a contact jaw 41 and a flow tube 42 are also fastened to the holding element 33.

A flanged tube 31 has an end surface 32 at its head end of its tubular part which is arranged coaxially with the center of the electrode.

The electrode 20 can be inserted into the flanged tube 31. This electrode 20 has a cylindrical bar 21 which acts as the wear part because of its contact with the melt 19 metallurgical vessel 10 and thus can be comprised of a simple metallic block. The electrode 20 also comprises a sleeve or copper part 22 which can be connected to the cylindrical bar 21. The cylindrical bar 21 also has a shoulder 23 of a size corresponding to and placed in abutting relation to the end surface 32 of the tube 31.

The sleeve 22 can be connected to the cylindrical bar 21 by connecting means 25, in the example shown by a clamping screw 26.

The sleeve 22 has cylindrical recesses or holes 24 facing away from the cylindrical bar 21, into which the coolant feed pipelines 51 are disposed. The diameter of each of the holes 24 is at least four times as great as the diameter of each of the pipelines 51. At the head end of each of the pipelines 51, which serve for the feeding of water, a nozzle 52 is placed.

The invention further contemplates the arrangement of thermocouples 60 in the sleeve 22 extending into cylindrical bar 21, i.e., the wear part, as well as the application of a suction pump 70 to the outlet or discharge line 53.

Figure 2:
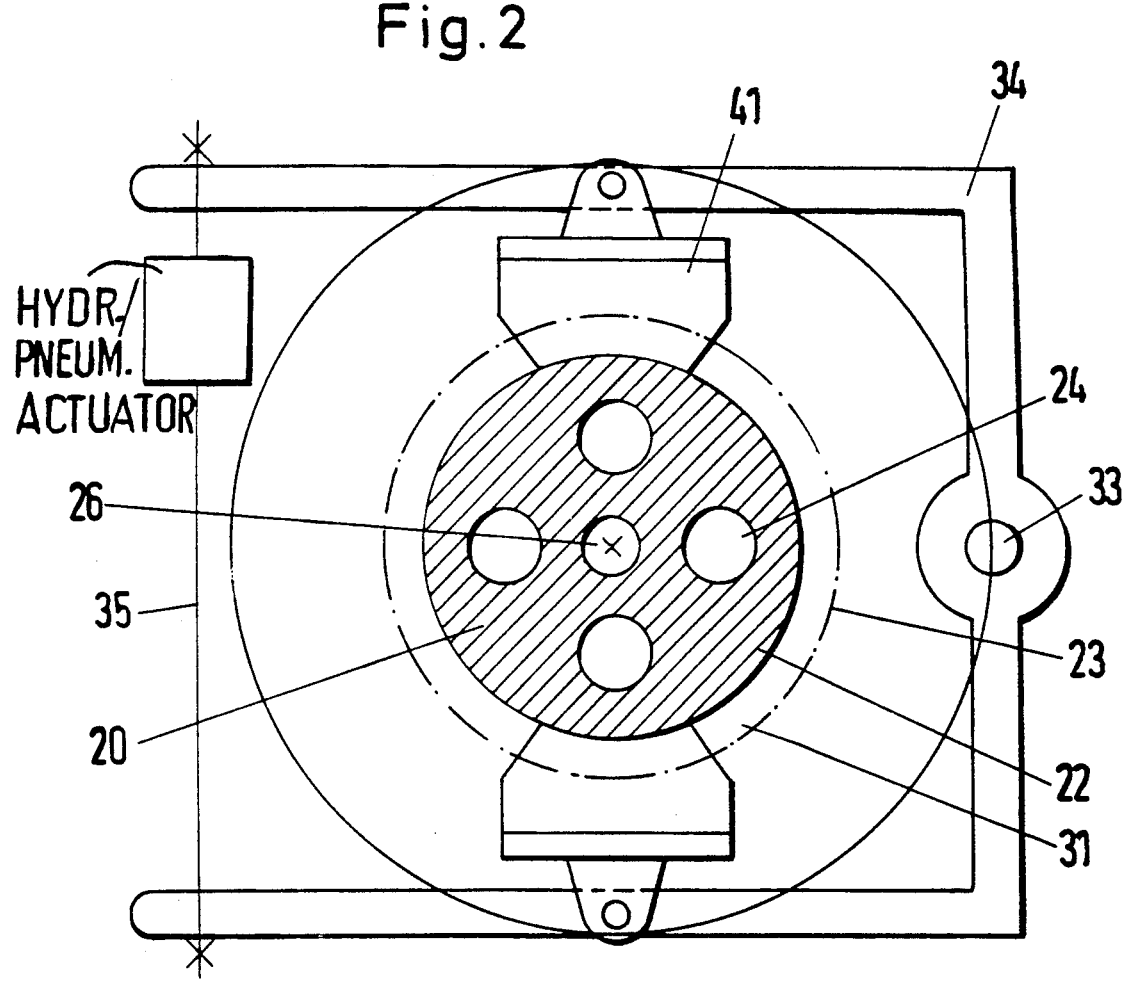
FIG. 2 is a cross-sectional view of a portion of the electrode shown in FIG. 1 taken along line 2—2 thereof.

FIG. 2 shows the cross-sectional view of the preferred embodiment of the invention, taken along line 2—2 of the bottom of the electrode 20 shown in FIG. 1.

The sleeve 22 of the electrode 20 has a plurality of holes 24. The clamping of the two electrode parts together by the clamping screw 26 is shown diagrammatically. The sleeve 22 is inserted through the flanged tube 31, the shoulder 23 of the electrode 20 being shown in FIG. 2 and FIG. 1.

The clamping pipe ring 34 is fastened to the holding element 33. The clamping ring 34 has a fork-shaped cross-sectional design and can be clamped by clamping elements 35. On the clamping ring 34, a group of contact jaws 41 are arranged and can be pressed against the sleeve 22 by means of the clamping elements 35 via the clamping ring 34.

While there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. It is the intention, therefore, to be limited only as indicated by the scope of the claims appended hereto.

What is claimed is:

1. A metallurgical vessel (10) with a metallic electrode (20) fastened thereto, comprising:
   a chamber within said vessel (10) for holding a melt (19) and having a bottom surface, a shell (14) abutting said bottom surface, and a flanged tube (31) fastened to said shell (14), said flanged tube (31) having a flanged surface (32), and a metallic electrode (20) disposed coaxially with respect to said flanged tube (31);
   first and second bars (21, 22) connectable to one another and comprising said electrode (20);
   said first bar (21) having a top and bottom face, said top face positioned proximate to the bottom surface of said chamber and penetrating said vessel (10) for contact with the melt (19);
   said second bar (22) positioned against said bottom face of said first bar (21) and extending out from said vessel (10);
   said first bar (21) having a shoulder region (23) positioned annularly thereabout and thereby expanding the diameter of said first bar (21);
   said shoulder region (23) adapted to contact and bear against said flanged surface (32) of said flanged tube (31);
   coolant provision and discharge means for providing coolant to said second bar (22) comprising a coolant feed line (51) and a discharge line (53);
   current feed means for providing current to said electrode (20) and placed in electrical contract with said electrode (20); and
   hold-down means (33) for attaching said current feed means (40), and coolant feed line (51) and said discharge line (53) to said flanged tube (31).

2. The vessel according to claim 1, further comprising at least one cylindrical aperture (24) positioned within said second bar (22) for receiving said coolant provision and discharge means.

3. The vessel according to claim 2, wherein said coolant feed line (51) comprises a pipeline having a head end, and an opening at said head end.

4. The vessel according to claim 3, wherein said pipeline further comprises nozzle means (52) positioned at said head end for increasing the speed of emergence of coolant.

5. The vessel according to claim 3, wherein said cylindrical aperture has an internal diameter and said pipeline has an external diameter, and wherein the ratio of said cylindrical aperture internal diameter of said pipeline external diameter is greater than or equal to 4:1.

6. The vessel according to claim 2, wherein said at least one cylindrical aperture (24) debouches into an open coolant discharge receptacle (53).

7. The vessel according to claim 1, further comprising at least one suction pump (70) arranged to pump out coolant through said discharge line (53).

8. The vessel according to claim 7, wherein said at least one suction pump (70) is a disk pump.

9. The vessel according to claim 1, wherein insulation means (13) for providing thermal insulation is positioned between said shell (14) and said flanged tube (31).

10. The vessel according to claim 1, wherein said hold-down means (33) comprises a clamping ring (34) on which contact jaws (41) are disposed for attaching said current feed means (40) to said flanged tube (31).

11. The vessel according to claim 10, wherein said clamping ring (34) further comprises clamping elements (35) for pressing said contact jaws (34) against said second bar (22).

12. The vessel according to claim 11, wherein said clamping elements (35) are mechanically actuatable.

13. The vessel according to claim 11, wherein said clamping elements (35) are pneumatically actuatable.

14. The vessel according to claim 13, wherein said connecting means (25) comprise welding or soldering means for intimately connecting said bars (21, 22) to one another.

15. The vessel according to claim 11, wherein said clamping elements (35) are hydraulically actuatable.

16. The vessel according to claim 1, further comprising connecting means (25) for connecting said first and second bars (21, 22) to one another.

17. The vessel according to claim 16, wherein said connecting means (25) comprise at least one clamping screw (26) which extends into said first bar (21) and said second bar (22), and presses said bars (21, 22) against one another in a force-locked manner.

18. The vessel according to claim 1, wherein thermocouple means pass through said second bar (22) and extend into said first bar (21).

19. The vessel according to claim 1, wherein said first bar (21) comprises a wearable material, and is replaceable.

20. The vessel according to claim 1, wherein said second bar (22) comprises an electrically conductive material.

* * * * *